PIEZOELECTRIC QUARTZ ELEMENTS

Filed Oct. 8, 1964

INVENTOR
J. J. ROYER
BY H. O. Wright
ATTORNEY

United States Patent Office 3,334,251
Patented Aug. 1, 1967

3,334,251

PIEZOELECTRIC QUARTZ ELEMENTS

James J. Royer, Allentown, Pa., assignor to Bell Telephone Laboratories, Incorporated, New York, N.Y., a corporation of New York Filed Oct. 8, 1964, Ser. No. 402,488
2 Claims. (Cl. 310—9.5)

Figure 1:
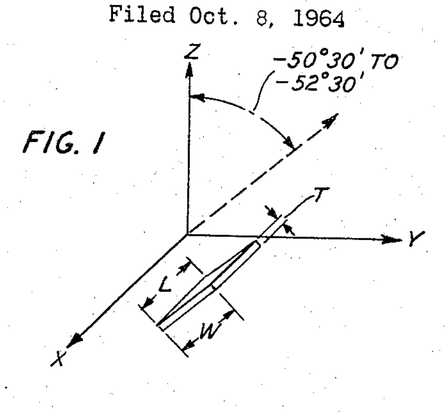

This invention relates to piezoelectric quartz elements employed principally as elements for use in frequency selective devices such as electrical wave filters, oscillators and the like. More particularly, it relates to the improvement of such elements.

In Patent No. 2,111,384 granted Mar. 15, 1938, to S. A. Bokovoy, it is disclosed, inter alia, that the so-called DT-cut crystal, comprising a rectangular plate cut from a single crystal of quartz with its length parallel to the X axis of the crystal and its major faces at an angle of substantially minus 52 degrees 30 minutes with respect to the Z axis of the crystal will have a substantially zero temperature coefficient of frequency provided the ratio $W/L$ of its width W (the dimension at an angle of substantially minus 52 degrees 30 minutes with respect to the Z axis) to its length L (its dimension parallel to the X axis) is substantially 0.4.

Reference may also be had to the "Standards on Piezoelectric Crystals," published in the Proceedings of the Institute of Radio Engineers, volume 37, No. 12, December 1949, pages 1378 through 1395, especially FIG. 19, page 1389, where the angle $\varphi$ may be varied from minus 50 degrees 30 minutes to minus 52 degrees 30 minutes and the length of the crystal is parallel to the X axis.

It has further been found that DT-cut crystals having a width to length ratio $W/L$ of substantially 0.4 will also have lower resistance, that is, a higher figure of merit Q (ratio of reactance to resistance) than "square"

$$\left(\frac{W}{L}=1\right)$$

DT-cut crystals.

While the Bokovoy patent suggests specific limits for the thicknesses of such crystals and further suggests that crystals conforming to its specification will be free from spurious or unwanted resonant vibrations at frequencies in the vicinity of the principal mode of vibration, this has not always been found to be the case.

Indeed, an investigation by applicant of the distribution of the frequencies of unwanted modes with respect to their respective proximities to the frequency of the wanted mode of vibration of DT-cut crystals having a width to length ratio of 0.4 has disclosed that at particular values of the thickness of the crystal one or more spurious or unwanted modes of vibration may occur at frequencies in such close proximity to that of the wanted mode as to seriously interfere with the correct performance of the crystal when used in filter or oscillator circuits or the like. Such unwanted resonances may result in "spikes" of attenuation in the pass band of a filter or oscillation at the spurious resonant frequency if the crystal is used in an oscillator.

Conversely, the investigation has revealed that over other ranges of thickness spurious or unwanted modes occur only at frequencies sufficiently remote from that of the wanted mode that they do not interfere with the correct performance of the crystal.

It is, accordingly, a principal object of the invention to eliminate difficulties resulting from the proximity of spurious or unwanted modes of vibration to the wanted mode for DT-cut quartz crystals having a width to length ratio of 0.4.

Figure 2:
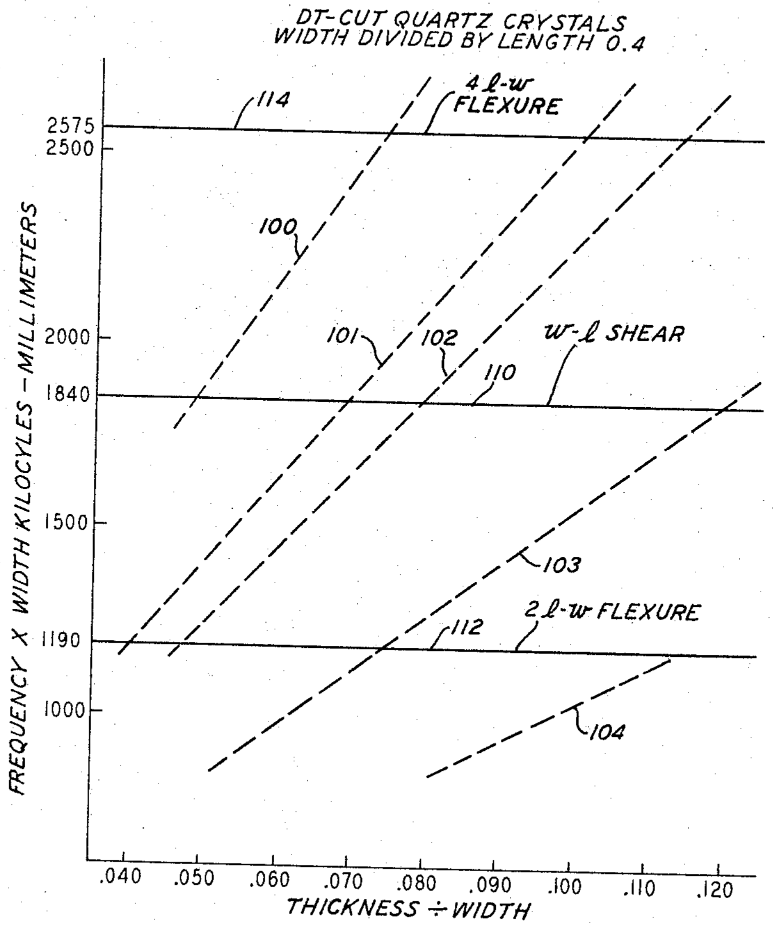

Other and further objects, features and advantages of the invention will become apparent from a perusal of the following detailed description of illustrative arrangements of the invention and from the appended claims taken in conjunction with the accompanying drawing, in which:

FIG. 1 illustrates the class of DT-cut crystals having a width to length ratio of 0.4 of interest in connection with the present invention; and FIG. 2 is a graphic showing of the relative proximities of spurious or unwanted resonances to the principal or face shear mode resonance (w–l shear) of the crystal.

In more detail in FIG. 1, the rectangular quartz crystal 10 is cut from a single crystal of quartz whose axes, designated Z, X and Y, respectively, are oriented as indicated in the figure. The length L is parallel to the X axis as are the major faces of the crystal 10. The crystal 10 is rotated about the X axis through a "negative" or clockwise angle of 50 degrees 30 minutes to 52 degrees 30 minutes with respect to the Z axis. The width W of the crystal is substantially 0.4 of the length L, and the thickness T in accordance with the teachings of the present invention is between 0.05 and 0.125 of the width W and is chosen to be within specific portions of this over-all range depending upon the separation required between the wanted resonance and the nearest spurious or unwanted resonance of the specific crystal.

More specifically, if no spurious or unwanted resonance frequency is desired within plus or minus five percent of the face-shear mode or wanted resonance frequency of a DT-cut crystal having a width to length ratio of substantially 0.4, the thickness to width ratio should fall within one of the two regions 0.0525 to 0.0638 and 0.0825 to 0.1138.

The optimum values within these two regions are substantially 0.058 and 0.095, respectively, for which values no spurious resonant frequencies within plus or minus ten percent of the face-shear mode or wanted resonance frequency will occur.

The width to length ratio may vary between 0.39 to 0.41 without greatly altering the intercept points on FIG. 2 discussed below, and the optimum values will remain the same.

The above discussed relationships are illustrated graphically in FIG. 2 which indicates by the inclined dashed or broken lines 100 through 104, inclusive, the approximate loci of spurious or unwanted resonance frequencies as a function of the ratio of thickness to width of the crystal. The ordinates are in terms of the well known "frequency constant," that is, the product of the frequency and the width of the crystal. This is, for example, essentially the constant K of Equation 1 of the Bokovoy patent, page 2, column 2, line 38, except that, in the said Equation 1, X is the length of the crystal. Since by definition, for the purposes of the present application, all crystals with which the present application is concerned are DT-cut crystals having a width to length ratio of substantially 0.4, it is obviously permissible to employ either length or width so long as, in the latter case, the ordinates are multiplied by substantially 0.4 and the abscissa are multiplied by 2.5 as has been done in drawing FIG. 2.

The width is chosen as more appropriate in the present case since the direction of propagation of the main shear wave is in the width direction and the width is therefore in this particular instance the primary frequency determining dimension.

The main or wanted face-shear mode resonance will of course occur at the wanted frequency corresponding to the frequency constant value of 1840 indicated by horizontal line 110. The second and fourth length-width flexure mode resonances will occur at frequencies well below and well above that of the main resonance, that is, at frequency constants of 1190 and 2575, represented by horizontal lines 112 and 114, respectively.

The favorable regions of the thickness to width ratio may be determined by inspection of FIG. 2 and will be substantially as stated in detail hereinabove.

Numerous modifications and variations of the arrangements disclosed hereinabove may readily be made by those skilled in the art without departing from the spirit of the principles of the invention. Accordingly, the disclosed arrangements are to be understood to be illustrative but in no way as limiting the invention.

What is claimed is:

1. A DT-cut quartz crystal having a width to length ratio of substantially 0.4 and a thickness to width ratio of substantially 0.058.

2. A DT-cut quartz crystal having a width to length ratio of substantially 0.4 and a thickness to width ratio of substantially 0.095.

References Cited

UNITED STATES PATENTS

| | | | |
|---|---|---|---|
| 2,111,384 | 3/1938 | Bokovoy | 310—9.5 |
| 2,505,121 | 4/1950 | Knights | 310—9.5 |
| 3,072,806 | 1/1963 | Sogan | 310—9.5 |

MILTON O. HIRSHFIELD, *Primary Examiner.*

J. D. MILLER, *Assistant Examiner.*